W. K. OMICK.
PNEUMATIC SPRING FOR VEHICLES.
APPLICATION FILED MAY 18, 1912.
1,114,285.
Patented Oct. 20, 1914.
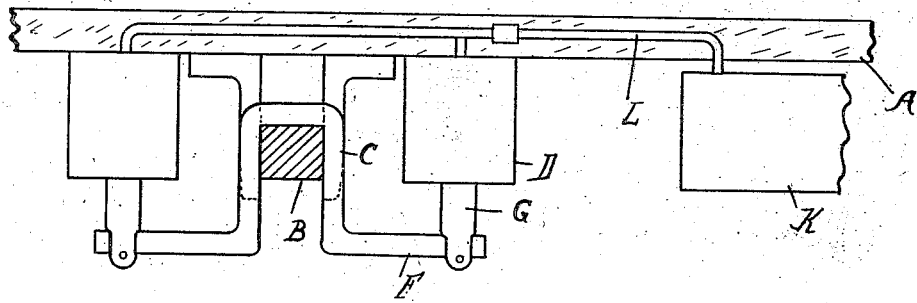
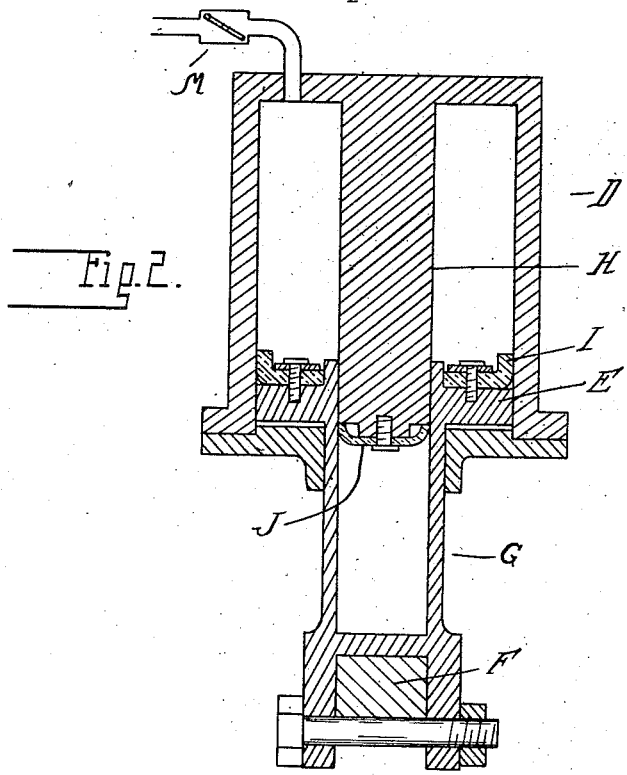
Witnesses
H. B. Ford
James P. Barry
Inventor
William K. Omick
By Whittemore Hulbert & Whittemore
Attys

UNITED STATES PATENT OFFICE.

WILLIAM K. OMICK, OF DETROIT, MICHIGAN.

PNEUMATIC SPRING FOR VEHICLES.

1,114,285.  Specification of Letters Patent.  Patented Oct. 20, 1914.

Application filed May 18, 1912. Serial No. 698,183.

*To all whom it may concern:*

Be it known that I, WILLIAM K. OMICK, a citizen of the United States of America, residing at Detroit, in the county of Wayne and State of Michigan, have invented certain new and useful Improvements in Pneumatic Springs for Vehicles, of which the following is a specification, reference being had therein to the accompanying drawings.

The invention relates to vehicle springs and has for its object the obtaining of a pneumatic spring suspension combined with a shock absorber which will retard and check the recoil.

To this end the invention consists in the construction as hereinafter set forth.

In the drawings: Figure 1 is a side elevation of the pneumatic spring suspension. Fig. 2 is a section through the cylinder and piston.

A is the frame of the vehicle and B is one of the axles vertically adjustably secured to the frame by suitable means such as the guide C.

D are cylinders containing pistons E and which constitute the pneumatic spring. As shown, these cylinders and pistons are arranged between bearings on the frame A and a yoke bearing F on the axle, the cylinder being secured to the frame and the piston to the yoke. The piston rod G is tubular and is adapted to receive a stationary plunger H secured to the head of the cylinder.

I is a packing such for instance as a leather cup secured to the piston E and J is a similar packing secured to the end of the plunger H.

With the construction described, whenever the cylinders D are supplied with compressed air the pneumatic pressure acting oppositely upon the head of the cylinder and upon the piston will lift the former, thereby supporting the frame upon the pneumatic cushion. The compressed air is preferably supplied to the cylinder from a storage tank K, in which it is maintained at the desired pressure by suitable means (not shown). From the storage tank K conduits L extend to the various cylinders, communicating with the chambers above the pistons, but on account of the packing J the air will not pass into the chamber within the hollow piston rod G. Thus as the cylinders are forced upward by the air pressure a partial vacuum will be formed within the hollow rod G, tending to retard the upward movement. Normally the cylinders are held in their raised positions by the pneumatic pressure, which not only operates against the exposed face of the piston but also gradually leaks through the packing J until the chamber within the hollow piston rod G is filled with air at the same pressure operating against the plunger H. Thus the whole area of the piston is subjected to the pneumatic pressure. Whenever there is an upward movement of the piston due to a rise in the road bed or from any other cause the first effect is to compress the air within both the cylinder and the hollow piston rod. As the length of the clearance space in the hollow piston rod chamber is less than the length of clearance space in the cylinder, it is obvious that the pressure in the former will rise faster than that in the latter, but as the air compressed within the hollow piston is free to move in the cylinder a portion of the compressed air will pass from the hollow piston chamber into the cylinder. This pressure is prevented from escaping into the tank K by a check-valve M having a restricted port therethrough, which automatically closes upon the rise of pressure, and retards the escape of air from the cylinder into the tank. During this upward movement of the piston the packing J will permit the air compressed within the hollow piston rod G to pass freely into the cylinder chamber, but upon the reverse movement of parts the packing J will seal so that a partial vacuum is formed within the hollow rod G as previously described. This will operate as a shock absorber, retarding the recoil and checking the oscillations.

What I claim as my invention is:

1. A pneumatic suspension for vehicles, comprising a cylinder, a piston therein, a hollow piston rod constituting a cylinder of lesser clearance space than said first-mentioned cylinder, a plunger on said first-mentioned cylinder extending into said hollow piston rod, and means for controlling the transfer from said cylinders, whereby upon movement in one direction compression takes place in both cylinders and upon movement in the opposite direction one of said cylinders forms a dash pot.

2. A pneumatic suspension for vehicles, comprising a cylinder, a piston therein, a hollow piston rod constituting a cylinder of lesser clearance space within the first-mentioned cylinder, a plunger on said first-mentioned cylinder extending into said hollow piston rod, a packing coöperating with said plunger to permit of the restricted flow from the cylinder to the hollow piston rod in the normal position of the parts, a substantially free flow from the hollow piston rod to the main cylinder upon movement in one direction and preventing free flow from the cylinder to the hollow piston rod in the opposite direction.

In testimony whereof I affix my signature in presence of two witnesses.

WILLIAM K. OMICK.

Witnesses:
 JAMES P. BARRY.
 H. E. BOWMAN.